(12) United States Patent
Burke

(10) Patent No.: US 12,114,763 B2
(45) Date of Patent: Oct. 15, 2024

(54) TETHER CLIP

(71) Applicant: GUARDIAN FALL LTD, Kent (GB)

(72) Inventor: Craig Andrew Burke, Sydney (AU)

(73) Assignee: GUARDIAN FALL LTD, Kent (GB)

(*) Notice: Subject to any disclaimer, the term of this patent is extended or adjusted under 35 U.S.C. 154(b) by 223 days.

(21) Appl. No.: 17/639,799

(22) PCT Filed: Sep. 4, 2020

(86) PCT No.: PCT/GB2020/052131
§ 371 (c)(1),
(2) Date: Mar. 2, 2022

(87) PCT Pub. No.: WO2021/044165
PCT Pub. Date: Mar. 11, 2021

(65) Prior Publication Data
US 2022/0322815 A1 Oct. 13, 2022

Related U.S. Application Data

(60) Provisional application No. 62/895,730, filed on Sep. 4, 2019.

(51) Int. Cl.
*B66C 1/42* (2006.01)
*A45F 5/06* (2006.01)
*F16B 2/10* (2006.01)

(52) U.S. Cl.
CPC ............ *A45F 5/06* (2013.01); *F16B 2/10* (2013.01); *A45F 2200/0575* (2013.01)

(58) Field of Classification Search
CPC ......... Y10T 24/44487; Y10T 24/44342; Y10T 24/44316; Y10T 24/44299;
(Continued)

(56) References Cited

U.S. PATENT DOCUMENTS 296,126 A * 4/1884 Burgess .................. B66C 1/422
403/291
1,832,647 A * 11/1931 Mihaliak .................. A01B 1/18
294/50.8
(Continued)

FOREIGN PATENT DOCUMENTS

CA 2819601 C 9/2018
CN 206886537 U 1/2018
(Continued)

OTHER PUBLICATIONS

Int'l l Search Report and Written Opinion, mailed Nov. 20, 2020, for corresponding PCT application PCT/GB2020/052131.

Primary Examiner — Robert Sandy
Assistant Examiner — Michael S Lee
(74) Attorney, Agent, or Firm — Dicke, Billig & Czaja, PLLC

(57) ABSTRACT

A tether clip comprises first and second clip portions and a connector. The first clip portion has a first intermediate portion interconnecting a first clamping end and a first connector end, and the second clip portion has a second intermediate portion interconnecting a second clamping end and a second connector end. The first and second intermediate portions are pivotally connected. The connector is positioned between the first and second connector ends and is configured and arranged to connect to a tether. When a force is exerted upon the connector, the connector moves relative to the first and second clip portions, and when the connector moves in a direction toward distal ends of the first and second connector ends, the first and second connector ends move apart and the first and second clamping ends move toward each other to increase a clamping force by the first and second clamping ends.

21 Claims, 10 Drawing Sheets

(58) Field of Classification Search
CPC ........... Y10T 24/44099; Y10T 24/1394; Y10T 24/44966; F16B 2/10; B66C 1/422
See application file for complete search history.

(56) References Cited

U.S. PATENT DOCUMENTS

| | | | |
|---|---|---|---|
| 2,378,570 A * | 6/1945 | Mitchell | B66C 1/422 |
| | | | 294/81.61 |
| 2,574,835 A * | 11/1951 | Loney | B66C 1/422 |
| | | | 294/115 |
| 7,055,281 B1 | 6/2006 | Faneuf | |
| D683,653 S | 6/2013 | Moreau et al. | |
| D699,100 S | 2/2014 | Moreau et al. | |
| 8,756,771 B1 | 6/2014 | Moreau et al. | |
| 9,375,074 B2 | 7/2016 | Moreau et al. | |
| D763,673 S | 8/2016 | Moreau et al. | |
| 9,756,890 B2 | 9/2017 | Moreau et al. | |
| 10,111,412 B1 | 10/2018 | Herbert | |
| 11,143,220 B2 | 10/2021 | Betcher et al. | |
| 2017/0119138 A1 | 4/2017 | Moreau et al. | |

FOREIGN PATENT DOCUMENTS

| | | |
|---|---|---|
| GB | 2295629 A | 6/1996 |
| JP | 2014128232 A | 7/2014 |
| WO | 2018132316 A1 | 7/2018 |

\* cited by examiner

TETHER CLIP

CROSS-REFERENCE TO RELATED APPLICATIONS

This application claims the benefit of U.S. Provisional Patent Application Ser. No. 62/895,730, filed Sep. 4, 2019, which is incorporated in its entirety herein by reference.

BACKGROUND

A tether is commonly used to interconnect an object such as, but not limited to, a hard hat, safety glasses, a mobile device, and a tool to a user to prevent the object from falling during use. One end of the tether could be connected to the user with a tether clip, but current tether clips have limitations. For example, some tether clips deform and/or do not have enough friction to provide a secure connection.

For the reasons stated above and for other reasons stated below, which will become apparent to those skilled in the art upon reading and understanding the present specification, a need exists for the present invention.

SUMMARY

The above-mentioned problems associated with prior devices are addressed by embodiments of the disclosure and will be understood by reading and understanding the present specification. The following summary is made by way of example and not by way of limitation.

In one embodiment, a tether clip comprises a first clip portion, a second clip portion, and a connector. The first clip portion has a first intermediate portion interconnecting a first clamping end and a first connector end. The second clip portion has a second intermediate portion interconnecting a second clamping end and a second connector end. The first intermediate portion and the second intermediate portion are operatively connected. The connector is positioned between the first connector end and the second connector end, and the connector is configured and arranged to connect to a tether. When a force is exerted upon the connector, the connector is configured and arranged to move relative to the first clip portion and the second clip portion. When the connector moves in a direction toward distal ends of the first and second connector ends, the first and second connector ends move apart and the first and second clamping ends move toward each other to increase a clamping force by the first and second clamping ends.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

Figure 1:
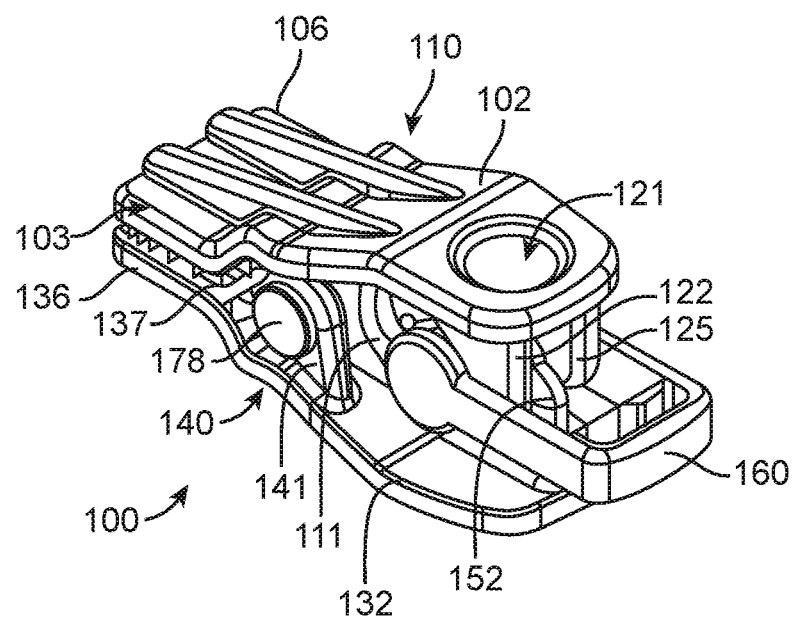
FIG. 1 is a side top perspective view of a tether clip in a closed position constructed in accordance with the principles of the present invention.
Figure 2:
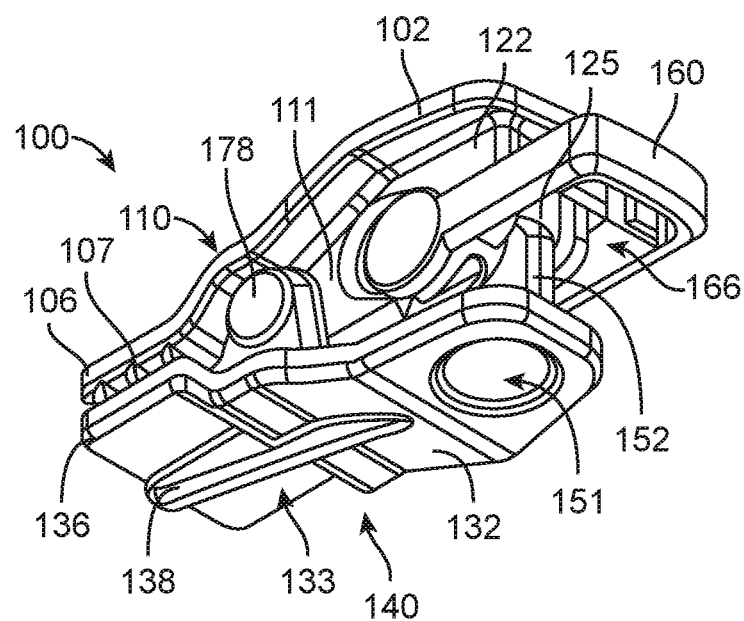
FIG. 2 is a side bottom perspective view of the tether clip shown in FIG. 1.
Figure 3:
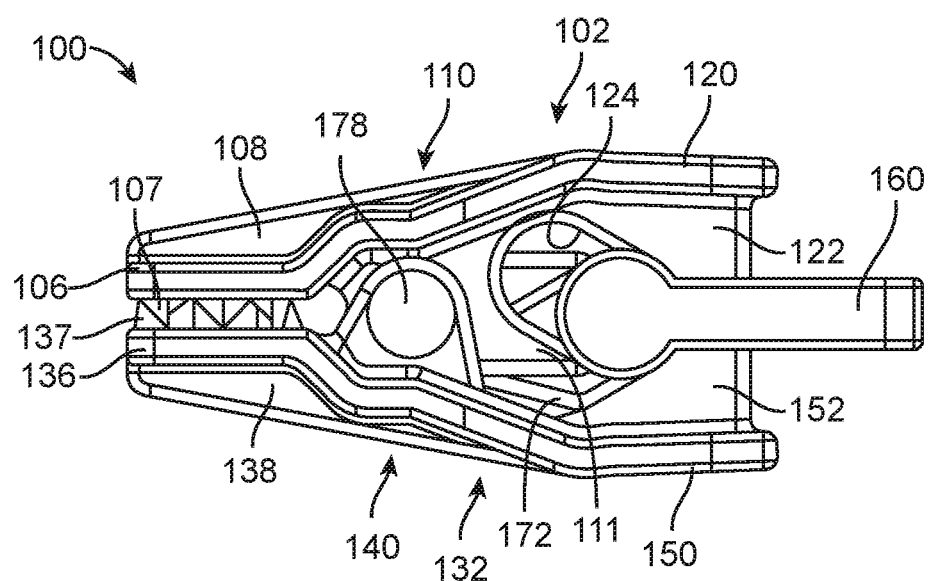
FIG. 3 is a side view of the tether clip shown in FIG. 1.
Figure 4:
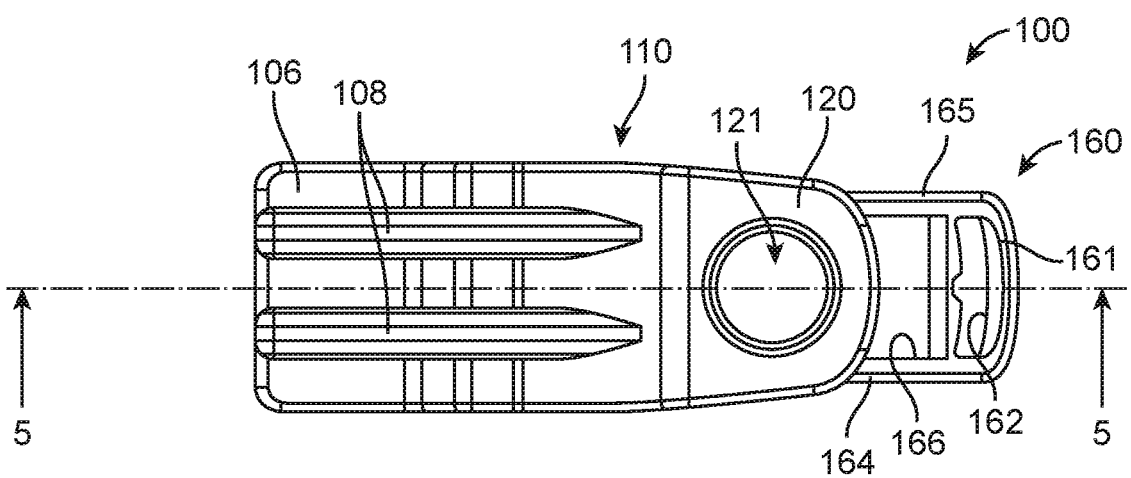
FIG. 4 is a top view of the tether clip shown in FIG. 1.

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide a tether clip to which a tether is connected, and when a force is exerted on the tether, the tether moves a connector relative to first and second clip portions of the tether clip. When the connector moves in a direction toward the distal ends of first and second connector ends of the tether clip, a clamping force of first and second clamping ends of the tether clip increases.

One example tether clip 100, shown in FIGS. 1-11, includes a first clip portion 102, a second clip portion 132, and a connector 160. The first clip portion 102 includes an outer surface 103 and an inner surface 104, and the second clip portion 132 includes an outer surface 133 and an inner surface 134. When the tether clip 100 is assembled, the inner surfaces 104 and 134 face each other.

The first clip portion 102 includes a clamping end 106, an intermediate portion 110, and a connector end 120. The clamping end 106 includes teeth 107 extending outward from the inner surface 104. Although teeth 107 are shown and described, it is recognized that other suitable textures could be used. In addition, the teeth 107 or other texture could be overmolded in rubber or an elastomer material. Optionally, gusset(s) 108 could extend outward from the outer surface 103 proximate a distal end of the clamping end 106 toward the intermediate portion 110 to add strength to the clamping end 106.

The intermediate portion 110 includes a first intermediate extension 111 and a second intermediate extension 114 extending outward from opposing sides of the intermediate portion 110. The first and second intermediate extensions 111 and 114 extend downward from the inner surface 104 and then toward the connector end 120. The first intermediate extension 111 includes a first aperture 112, and the second intermediate extension 114 includes a second aperture 115. The first and second apertures 112 and 115 align. A ramp portion 113 is formed between where the first intermediate extension 111 extends from the inner surface 104 and a distal end of the first intermediate extension 111. A ramp portion 116 is formed between where the second intermediate extension 114 extends from the inner surface 104 and a distal end of the second intermediate extension 114.

The connector end 120 optionally includes a depression 121 or a textured surface on its outer surface 103 proximate its distal end. A first connector extension 122 and a second connector extension 125 extend outward from opposing sides of the connector end 120. The first and second connector extensions 122 and 125 extend downward from the inner surface 104. A ramp portion 123 is formed between where the first connector extension 122 extends from the inner surface 104 and a distal end of the first connector extension 122. A ramp portion 126 is formed between where the second connector extension 125 extends from the inner surface 104 and a distal end of the second connector extension 125.

The first intermediate extension 111 and the first connector extension 122 form a first notch 124, and the second intermediate extension 114 and the second connector extension 125 form a second notch 127.

The second clip portion 132 includes a clamping end 136, an intermediate portion 140, and a connector end 150. The clamping end 136 includes teeth 137 extending outward from the inner surface 134. Although teeth 137 are shown and described, it is recognized that other suitable textures could be used. In addition, the teeth 107 or other texture could be overmolded in rubber or an elastomer material. Optionally, at least one gusset 138 could extend outward from the outer surface 133 proximate a distal end of the clamping end 136 toward the intermediate portion 140 to add strength to the clamping end 136.

The intermediate portion 140 includes a first intermediate extension 141 and a second intermediate extension 144 extending outward from opposing sides of the intermediate portion 140. The first and second intermediate extensions 141 and 144 extend upward from the inner surface 134. The first intermediate extension 141 includes a first aperture 142, and the second intermediate extension 144 includes a second aperture 145. The first and second apertures 142 and 145 align. A third intermediate extension 147 extends upward from the inner surface 134 generally between the first and second intermediate extensions 141 and 144. The third intermediate extension 147 extends upward from the inner surface 134 and toward the connector end 150. A ramp portion 148 is formed between where the third intermediate extension 147 extends from the inner surface 134 and a distal end of the third intermediate extension 147.

The connector end 150 optionally includes a depression 151 or a textured surface on its outer surface 133. A first connector extension 152 extends upward from the inner surface 134 proximate a distal end of the connector end 150. A ramp portion 153 is formed between where the first connector extension 152 extends from the inner surface and a distal end of the first connector extension 152. The first intermediate extension 141 and the first connector extension 152 form a first notch 154.

The connector 160 includes a first end 161 and a second end 163 interconnected by first side 164 and second side 165 forming an opening 166 therebetween. The first end 161 includes an aperture or slot 162 configured and arranged to receive a portion of a tether 190. The second end 163 optionally includes lateral grooves.

The biasing member 170 includes a coiled intermediate portion 173 from which its first end 171 and its second end 172 extend. The intermediate portion 173 forms a bore 174.

To assemble the tether clip 100, the intermediate portion 173 of the biasing member 170 is positioned so that its bore 174 aligns with the apertures 112 and 115 of the first clip portion 102 and the apertures 142 and 145 of the second clip portion 132. The first end 171 contacts the first clip portion 102, and the second end 172 contacts the second clip portion 132. The second end 163 of the connector 160 is positioned within the notches 124 and 127 of the first clip portion 102 and the notch 154 of the second clip portion 132. The shaft 179 of the fastener 178 is inserted through the apertures 142 and 112, the bore 174, and the apertures 115 and 145. An end of the tether 190 is inserted through the aperture or slot 162 of the first end 161 of the connector 160 and secured onto the tether. The other end of the tether 190 is configured and arranged to connect to another object such as, but not limited to, a hard hat, safety glasses, a mobile device, and a tool.

In operation, the tether clip 100 is connected to a user (e.g., a user's article such as the user's clothing, safety harness, and the like) by moving the tether clip 100 from its closed position, to its open position, and then back to its closed position. The connector ends 120 and 150 are moved toward one another, for example with a user's thumb and finger, thereby overcoming the biasing force of the biasing member 170, moving the first and second ends 171 and 172 toward one another, and moving the clamping ends 106 and 136 away from one another forming a gap therebetween. The user's article is inserted in the gap between the clamping ends 106 and 136, and then the connector ends 120 and 150 are released. When the connector ends 120 and 150 are released, the biasing member 170 exerts a biasing force against the connector ends 120 and 150, moving them away from one another and thereby moving the clamping ends 106 and 139 toward one another. The teeth 107 and 137 help engage the user's article thereby securing the tether clip 100 to the user's article.

Figure 5:
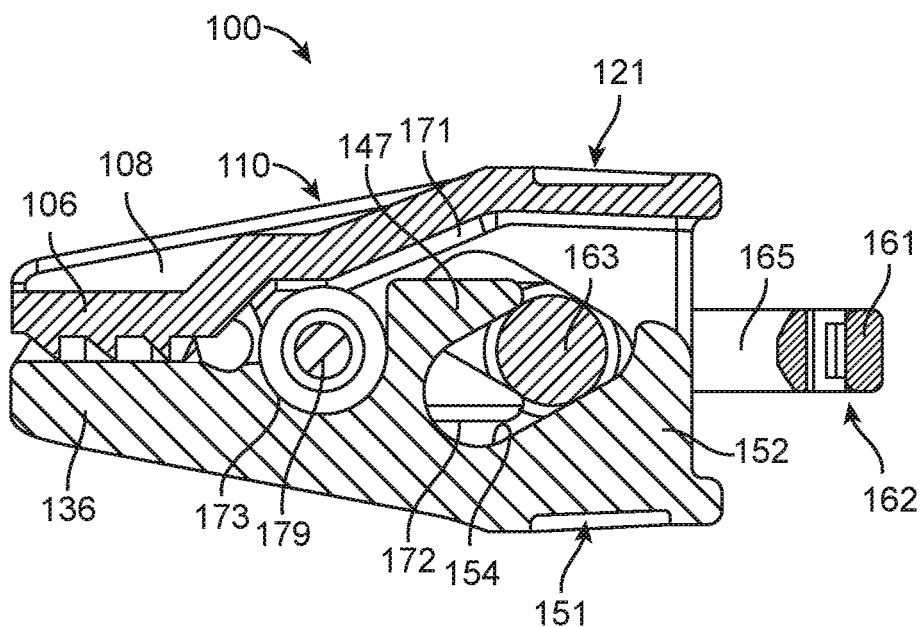
FIG. 5 is a cross section view of the tether clip taken along the lines 5-5 in FIG. 4.
Figure 6:
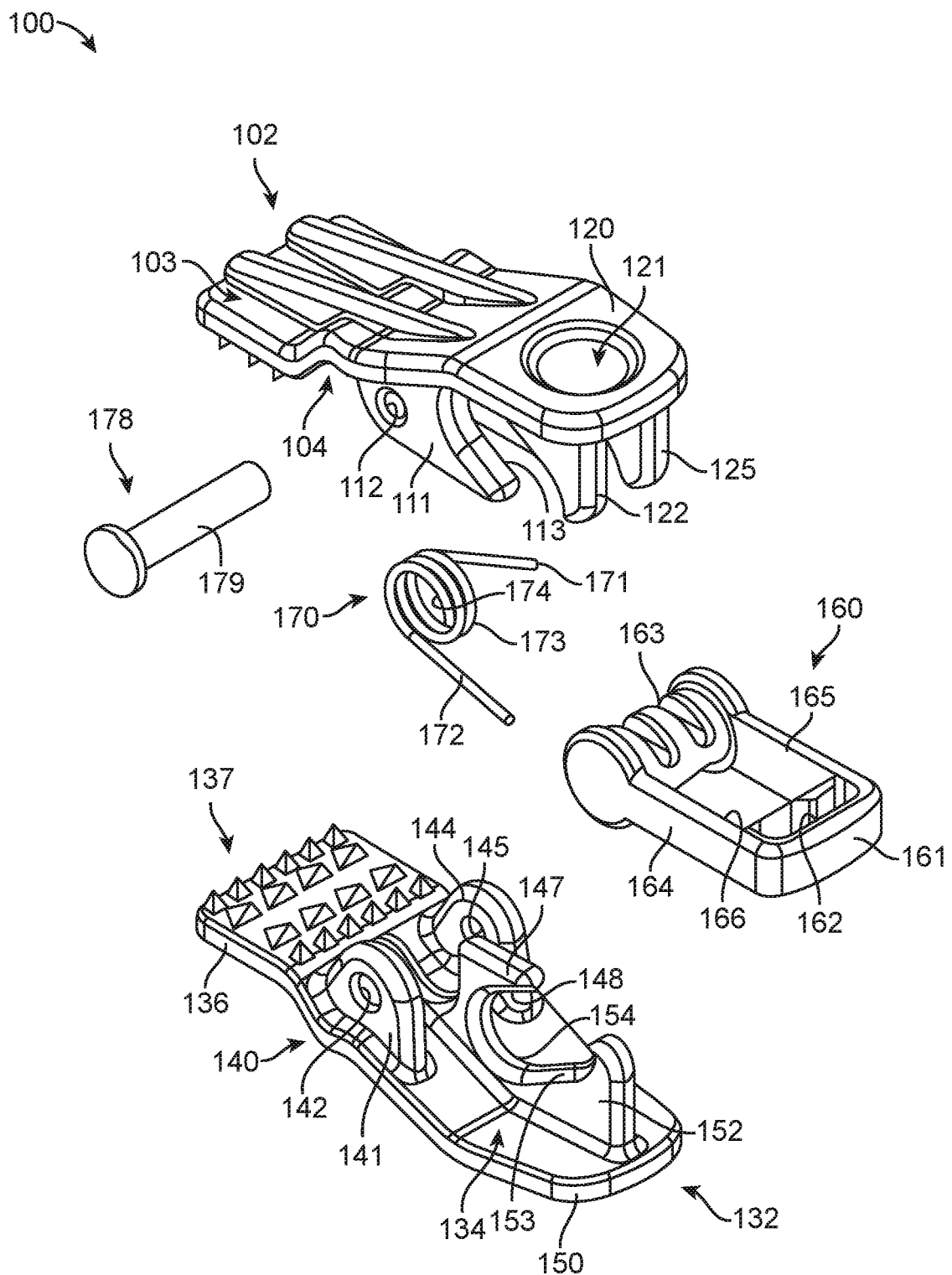
FIG. 6 is an exploded top perspective view of the tether clip shown in FIG. 1.
Figure 7:
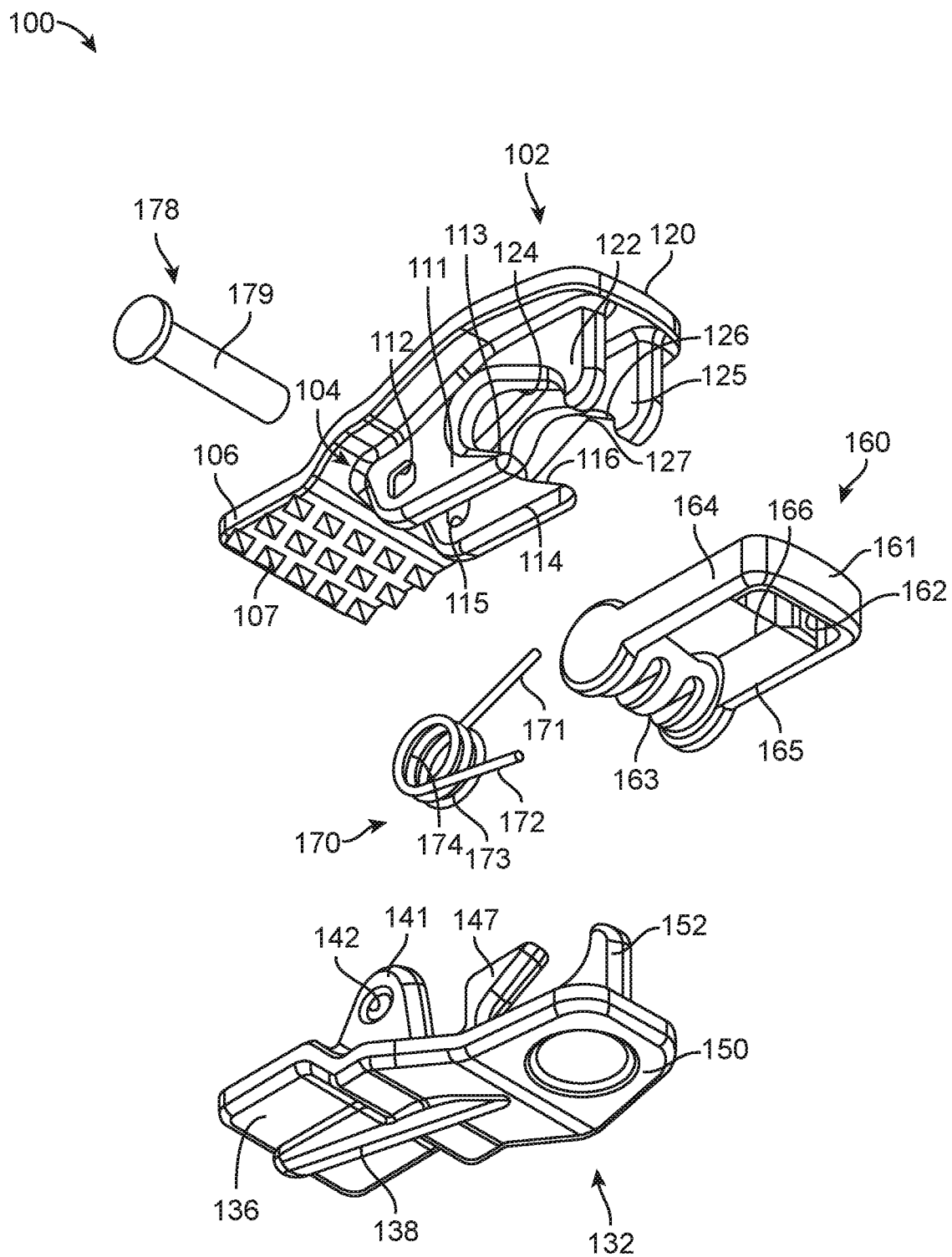
FIG. 7 is an exploded rear perspective view of the tether clip shown in FIG. 1.
Figure 8:
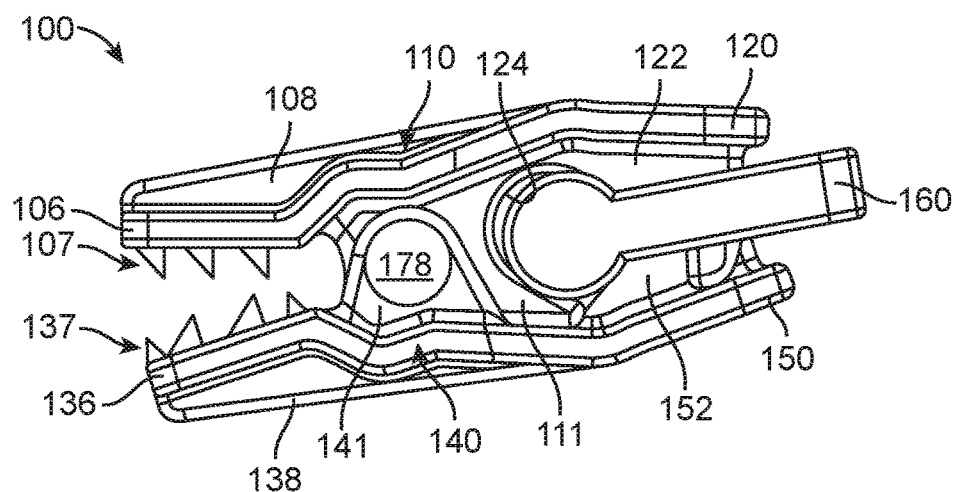
FIG. 8 is a side view of the tether clip shown in FIG. 1 in an open position.
Figure 9:
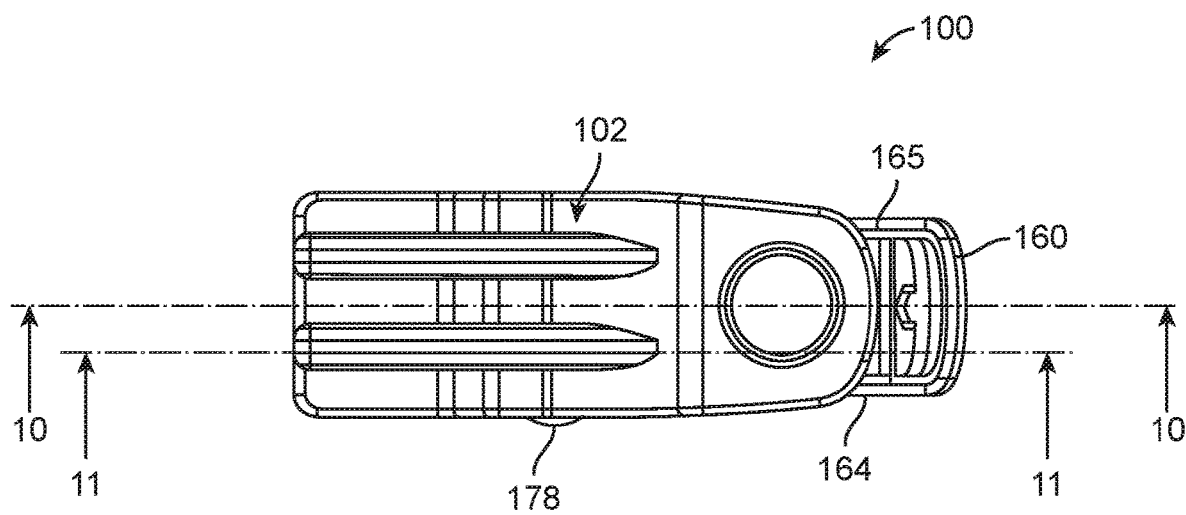
FIG. 9 is a top view of the tether clip shown in FIG. 8.
Figure 10:
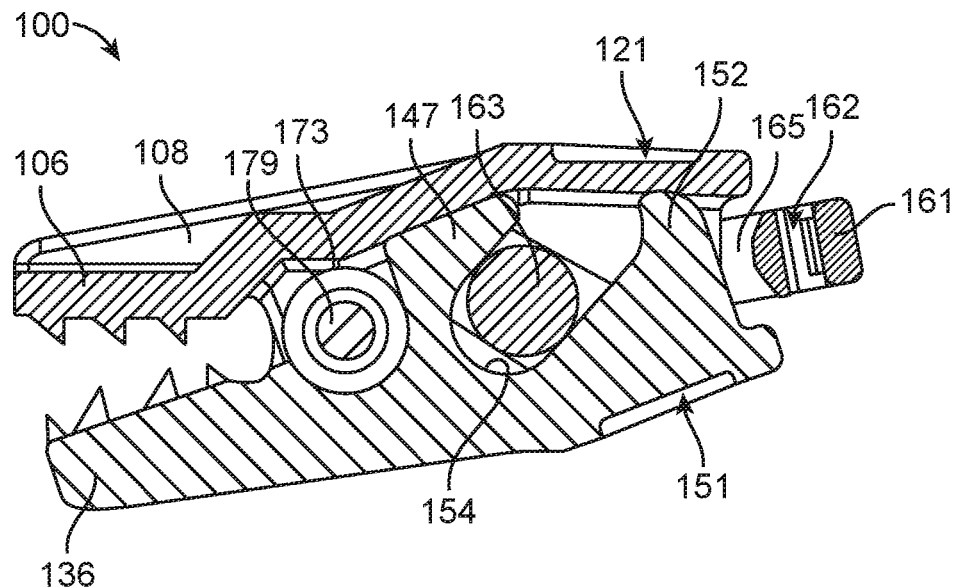
FIG. 10 is a cross section view of the ether clip taken along the lines 10-10 in FIG. 9.
Figure 11:
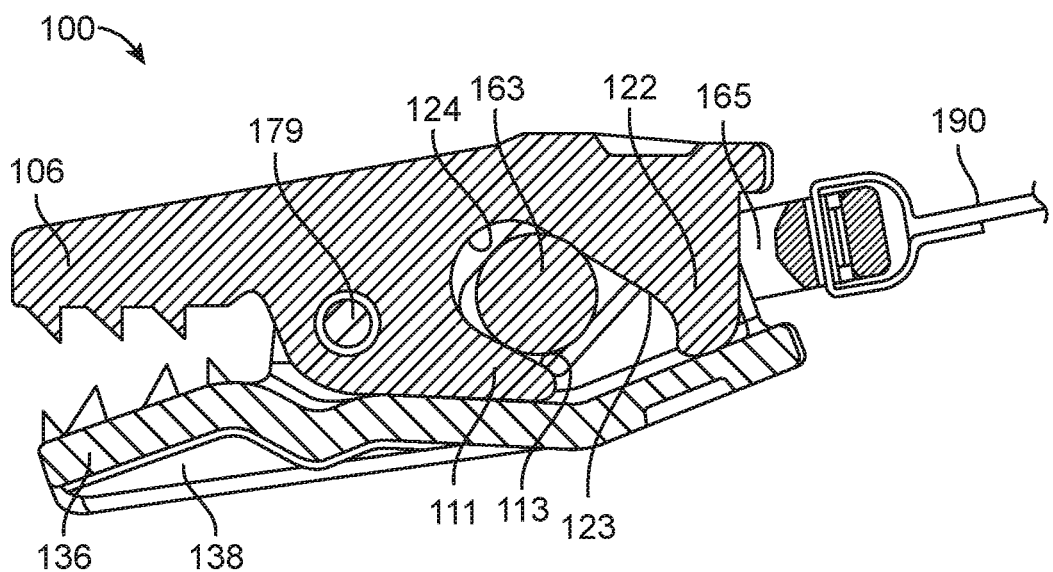
FIG. 11 is a cross section view of the ether clip taken along the lines 11-11 in FIG. 9.

Should the object connected to the other end of the tether 190 fall, a force is exerted on the tether 190 that moves the connector 160 relative to the first and second clip portions 102 and 132. When the connector 160 moves toward the distal ends of the connector ends 120 and 150, the ramps 113, 116, 123, 126, and 153 form a wedge that, as the connector 160 moves, moves the connector ends 120 and 150 further apart thereby increasing the clamping force of the clamping ends 106 and 136 on the user's article. At least one of the ramp portions provides a surface along which the connector 160 moves to increase the clamping force by the first and second clamping ends 106 and 136. This is shown in FIGS. 5, 10, and 11.

Figure 12:
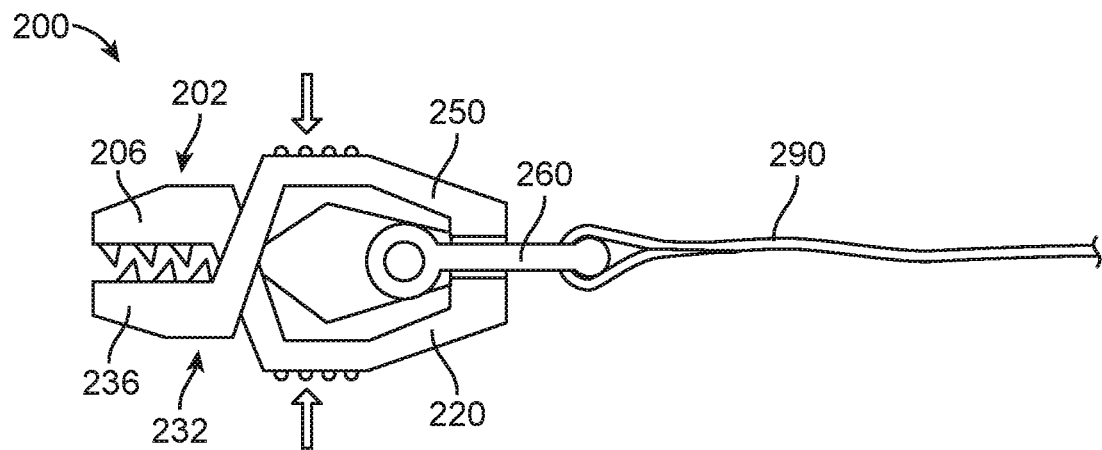
FIG. 12 is a side view of another embodiment tether clip in a closed position constructed in accordance with the principles of the present invention.
Figure 13:
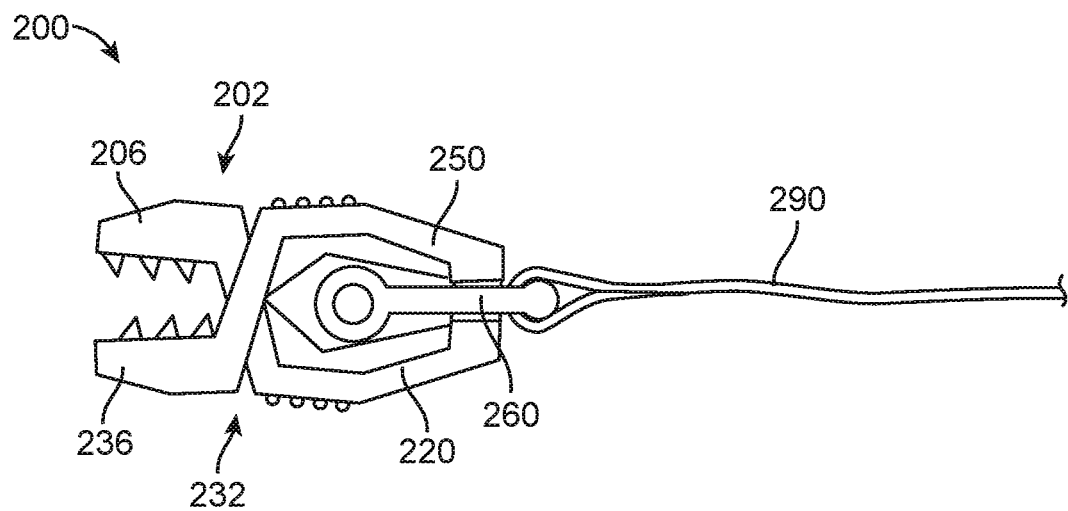
FIG. 13 is a side view of the tether clip shown in FIG. 12 in an open position.
Figure 14:
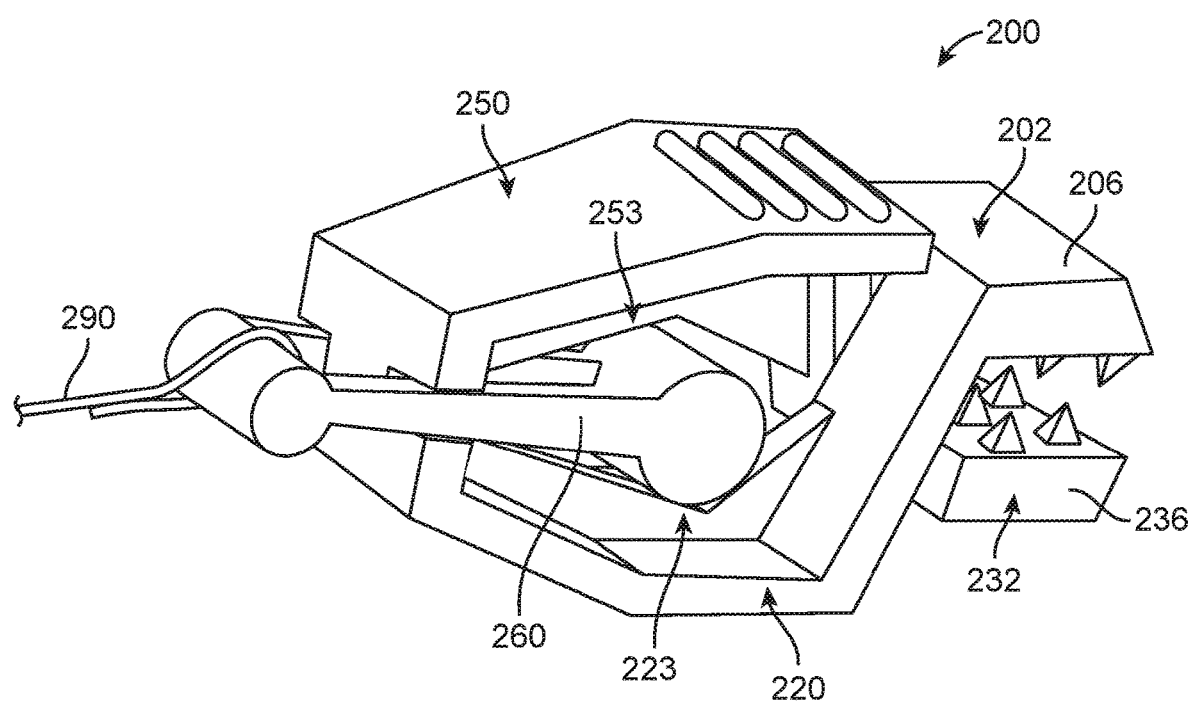
FIG. 14 is a perspective view of the tether clip shown in FIG. 12 in an open position.

One example tether clip 200, shown in FIGS. 12-14, is configured differently than tether clip 100 but operates similarly. Tether clip 200 includes first and second clip portions 202 and 232 that operate similarly with a connector 260 to which a tether 290 is connected. The first clamping end 206 and the first connector end 220 are positioned on opposite sides (top and bottom, respectively), and the second clamping end 236 and the second connector end 250 are positioned on opposite sides (bottom and top, respectively). The distal ends of the first and second connector ends 220 and 250 are operatively connected with sprung plastic, which hinges the first and second clip portions 202 and 232, placing a biasing force against the connector ends 220 and 250 to move them away from one another thereby moving the clamping ends 206 and 236 toward one another. The connector ends 220 and 250 include ramp portions 223 and 253 forming a wedge that move the connector ends 220 and 250 away from each other as the connector 260 moves toward the distal ends of the connector ends 220 and 250 thereby moving the clamping ends 206 and 236 toward each other and increasing the clamping force. This example optionally does not include a biasing member so that it could be used in applications in which metal cannot be used (e.g., nuclear applications).

Figure 15:
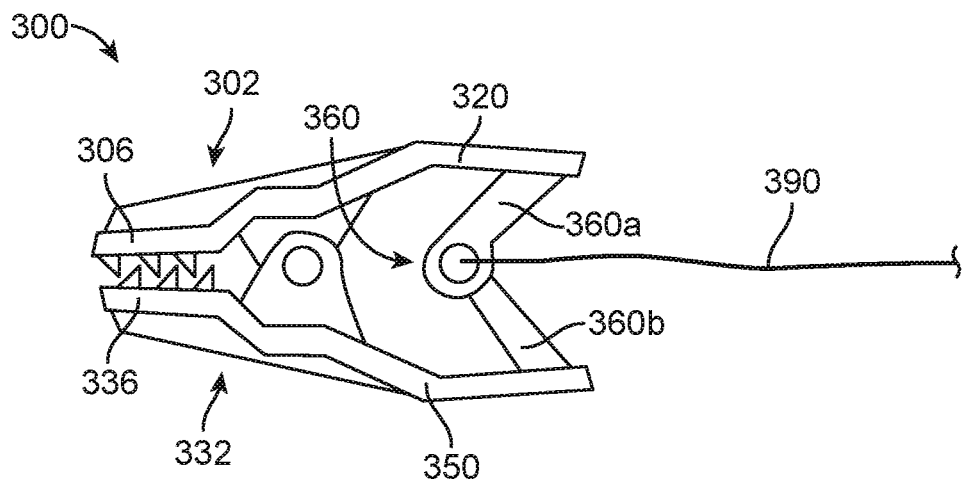
FIG. 15 is a side view of another embodiment tether clip in a closed position constructed in accordance with the principles of the present invention.
Figure 16:
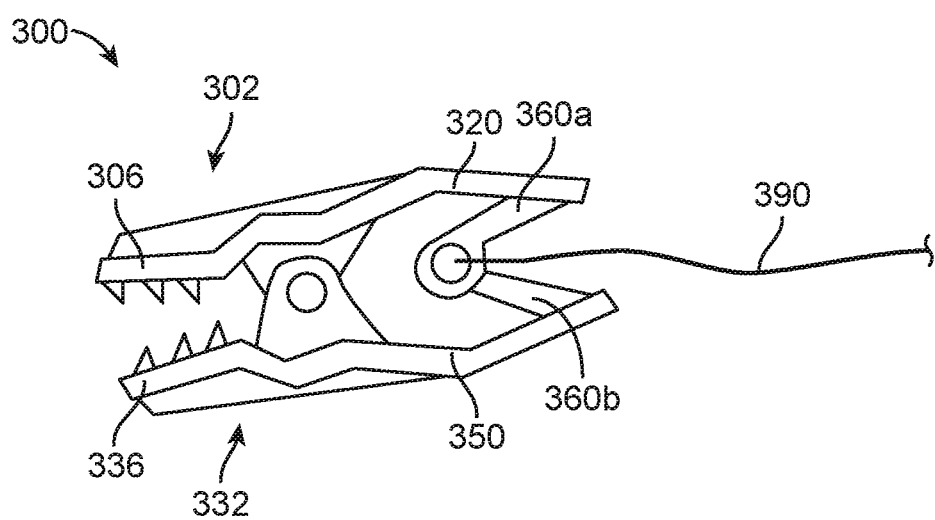
FIG. 16 is a side view of the tether clip shown in FIG. 15 in an open position.

One example tether clip 300, shown in FIGS. 15 and 16, is configured differently than tether clips 100 and 200 but operates similarly. The tether clip 300 includes first and second clip portions 302 and 332 that operate similarly with a connector 360 to which a tether 390 is connected (e.g., apertures in the distal ends of connector portions 360*a*, 360*b* through which the tether 390 is routed thereby also connecting the distal ends). The first and second clip portions 302 and 332 are preferably pivotally connected proximate the teeth of clamping ends 306, 336, and proximate intermediate portions of the clip portions 302, 332 generally between clamping ends 306, 336 and connector ends 320, 350 of the first and second slip portions 302, 332, respectively. The connector 360 includes a first connector portion 360*a* operatively connected to the first connector end 320 and a second connector portion 360*b* operatively connected to the second connector end 350, the first and second connector portions 360*a* and 360*b* interconnect the distal ends of the first and second clip portions 302 and 332, respectively. Preferably, the distal ends of the first and second connector portions 360*a* and 360*b* are pivotally connected. The first and second connector portions 360*a* and 360*b* place biasing forces against the connector ends 320 and 350 to move them away from one another thereby moving the clamping ends 306 and 336 toward one another. As the tether 390 is pulled, the connector portions 360*a* and 360*b* are pulled thereby moving the connector ends 320 and 350 away from one another and moving the clamping ends 306 and 336 toward one another and increasing the clamping force. The tether clip 300 is preferably molded as one piece. This example optionally does not include a biasing member so that it could be used in applications in which metal cannot be used (e.g., nuclear applications).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A tether clip, comprising:
a first clip portion having a first intermediate portion interconnecting a first clamping end and a first connector end, the first connector end including a first ramp portion;
a second clip portion having a second intermediate portion interconnecting a second clamping end and a second connector end, the second connector end including a second ramp portion, the first clip portion and the second clip portion being operatively connected; and
a connector positioned between the first ramp portion and the second ramp portion, the connector configured and arranged to connect to a tether, wherein when a force is exerted upon the connector, the connector is configured and arranged to move relative to the first clip portion and the second clip portion, and wherein when the connector moves in a direction toward distal ends of the first and second connector ends, the first and second ramp portions provide surfaces along which the connector moves and the first and second connector ends move apart and the first and second clamping ends move toward each other to increase a clamping force by the first and second clamping ends.

2. The tether clip of claim 1, further comprising a biasing member operatively connected to the first and second clip portions, the biasing member configured and arranged to bias the first and second clamping ends toward each other.

3. The tether clip of claim 1, wherein the first clamping end and the first connector end are positioned on opposite sides and the second clamping end and the second connector end are positioned on opposite sides of the tether clip.

4. The tether clip of claim 3, wherein the first clip portion and the second clip portion are operatively connected proximate the first connector end and the second connector end.

5. The tether clip of claim 4, wherein the first and second connector ends are operatively connected with sprung plastic thereby hinging the first and second clip portions.

6. The tether clip of claim 1, wherein the first intermediate portion and the second intermediate portion are pivotally connected.

7. The tether clip of claim 6, wherein the first and second intermediate portions are pivotally connected via a single pivot axis.

8. The tether clip of claim 1, wherein the connector is an integral piece.

9. The tether clip of claim 1, wherein the tether clip is metal-free.

10. The tether clip of claim 1, wherein the first and second ramp portions form a narrower opening proximate the distal ends of the first and second connector ends.

11. A tether clip, comprising:
a first clip portion having a first intermediate portion interconnecting a first clamping end and a first connector end, the first connector end including a first ramp portion;
a second clip portion having a second intermediate portion interconnecting a second clamping end and a second connector end, the second connector end including a second ramp portion, the first clip portion and the second clip portion being operatively connected, the first clamping end and the first connector end are positioned on opposite sides and the second clamping end and the second connector end are positioned on opposite sides of the tether clip; and a connector positioned between the first ramp portion and the second ramp portion, the connector configured and arranged to connect to a tether, wherein when a force is exerted upon the connector, the connector is configured and arranged to move relative to the first clip portion and the second clip portion, and wherein when the connector moves in a direction toward distal ends of the first and second connector ends, the first and second ramp portions provide surfaces along which the connector moves and the first and second connector ends move apart and the first and second clamping ends move toward each other to increase a clamping force by the first and second clamping ends.

12. The tether clip of claim 11, wherein the first clip portion and the second clip portion are operatively connected proximate the first connector end and the second connector end.

13. The tether clip of claim 12, wherein the first and second connector ends are operatively connected with sprung plastic thereby hinging the first and second clip portions.

14. The tether clip of claim 11, wherein the connector is an integral piece.

15. The tether clip of claim 11, wherein the tether clip is metal-free.

16. The tether clip of claim 11, wherein the first and second ramp portions form a narrower opening proximate the distal ends of the first and second connector ends.

17. A tether clip, comprising:
a first clip portion having a first intermediate portion interconnecting a first clamping end and a first connector end, the first connector end including a first ramp portion;

a second clip portion having a second intermediate portion interconnecting a second clamping end and a second connector end, the second connector end including a second ramp portion, the first clip portion and the second clip portion being operatively connected, the first intermediate portion and the second intermediate portion being pivotally connected; and a connector positioned between the first ramp portion and the second ramp portion, the connector configured and arranged to connect to a tether, wherein when a force is exerted upon the connector, the connector is configured and arranged to move relative to the first clip portion and the second clip portion, and wherein when the connector moves in a direction toward distal ends of the first and second connector ends, the first and second ramp portions provide surfaces along which the connector moves and the first and second connector ends move apart and the first and second clamping ends move toward each other to increase a clamping force by the first and second clamping ends.

18. The tether clip of claim 17, wherein the first and second intermediate portions are pivotally connected via a single pivot axis.

19. The tether clip of claim 17, further comprising a biasing member operatively connected to the first and second clip portions, the biasing member configured and arranged to bias the first and second clamping ends toward each other.

20. The tether clip of claim 17, wherein the connector is an integral piece.

21. The tether clip of claim 17, wherein the tether clip is metal-free.

* * * * *